US012773689B2

(12) United States Patent
Pochert et al.

(10) Patent No.: US 12,773,689 B2
(45) Date of Patent: Oct. 27, 2026

(54) LIQUID-METERING DEVICE FOR BALLISTICALLY DISCHARGING METERED AMOUNTS IN THE NANOLITER RANGE, LIQUID-METERING METHOD AND PIPETTING TIP THEREFOR

(71) Applicants: HAMILTON BONADUZ AG, Bonaduz (CH); BIOFLUIDIX GMBH, Freiburg (DE)

(72) Inventors: Jörg Pochert, Chur (CH); Andreas Ernst, Bollschweil (DE); Nils Lass, Oberkirch (DE)

(73) Assignees: HAMILTON BONADUZ AG, Bonaduz (CH); BIOFLUIDIX GMBH, Freiburg (DE)

( * ) Notice: Subject to any disclaimer, the term of this patent is extended or adjusted under 35 U.S.C. 154(b) by 1050 days.

(21) Appl. No.: 17/299,900

(22) PCT Filed: Dec. 2, 2019

(86) PCT No.: PCT/EP2019/083280
§ 371 (c)(1),
(2) Date: Jun. 4, 2021

(87) PCT Pub. No.: WO2020/114954
PCT Pub. Date: Jun. 11, 2020

(65) Prior Publication Data

US 2022/0023852 A1 Jan. 27, 2022

(30) Foreign Application Priority Data

Dec. 5, 2018 (DE) ......................... 102018131088.9

(51) Int. Cl.
*B01L 3/02* (2006.01)

(52) U.S. Cl.
CPC ........... *B01L 3/0237* (2013.01); *B01L 3/0224* (2013.01); *B01L 3/0268* (2013.01); *B01L 3/0275* (2013.01);
(Continued)

(58) Field of Classification Search
None
See application file for complete search history.

(56) References Cited

U.S. PATENT DOCUMENTS 3,837,633 A * 9/1974 Paulsen ..................... B25B 5/12
269/275
5,051,282 A * 9/1991 Tezuka .................... B01L 99/00
118/232
(Continued)

FOREIGN PATENT DOCUMENTS

DE 102015009695 A1 2/2015
EP 1279436 A2 1/2003
(Continued)

OTHER PUBLICATIONS

English translation of the International Preliminary Report on Patentability under Chapter I issued for PCT/EP2019/083280 on Jun. 4, 2020.

(Continued)

*Primary Examiner* — Brian R Gordon
(74) *Attorney, Agent, or Firm* — Brian A. Tollefson; Devlin Law Firm LLC

(57) ABSTRACT

A liquid-metering device for discharging metered liquid in the nanometer range, includes a pipetting-tip receiving device defining, at least in a metering-ready operating position of the liquid-metering device, a receiving space that runs along a virtual receiving axis and is designed to receive a portion of a pipetting-tip. The liquid-metering device also includes a triggering plunger moveable relative to the
(Continued)

Figure 1:
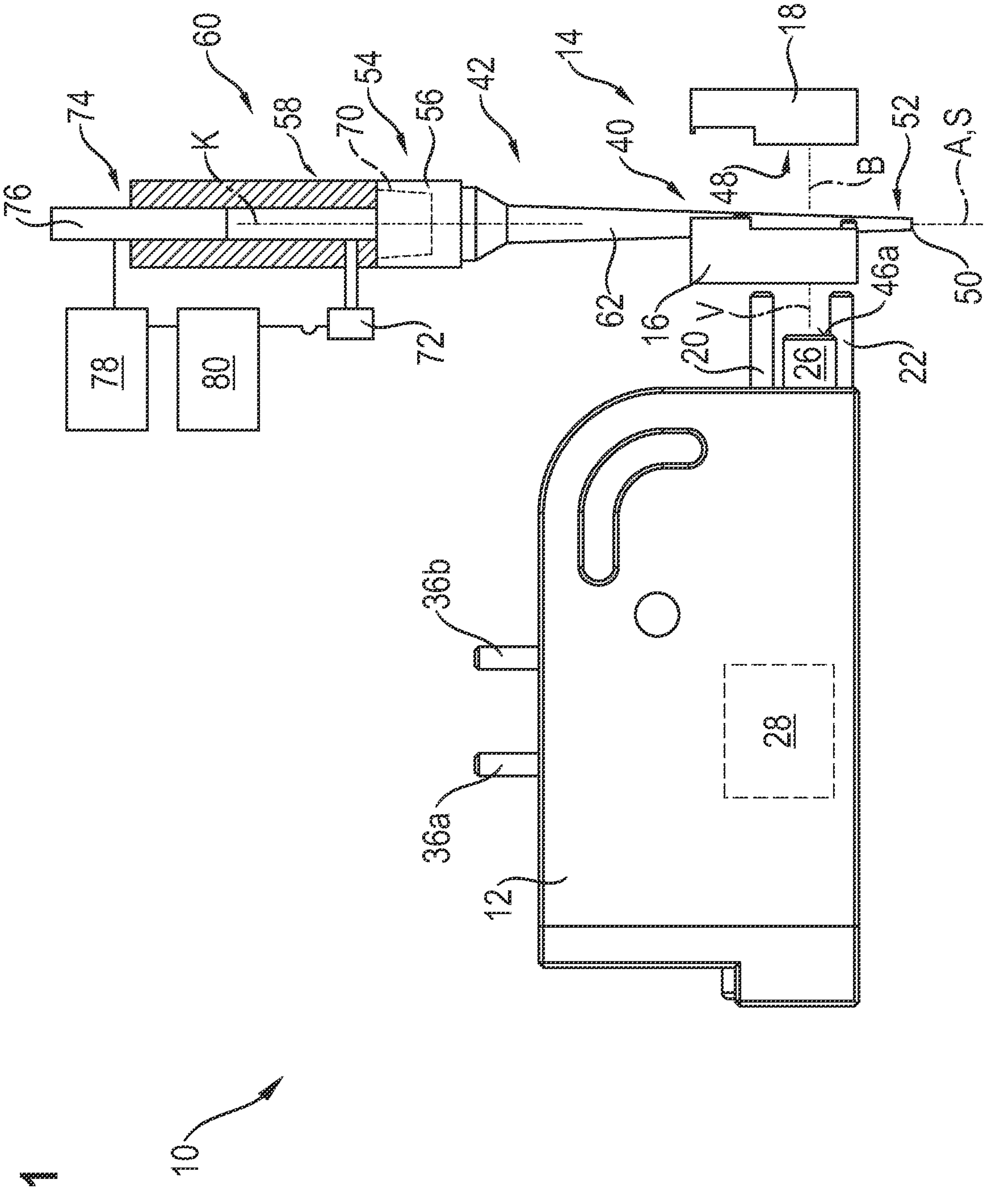

pipetting-tip receiving device, between a standby position and a triggering position. The liquid-metering device also includes movement drive, which is coupled to the triggering plunger so as to transmit motion, and a control device for controlling operation of the movement drive. A first and second deformation formation define therebetween an axial longitudinal region of the receiving space as a deformation region, in which region the first and second formations can be brought closer or farther away to/from one another. The triggering plunger is located in the deformation region.

19 Claims, 5 Drawing Sheets

(52) U.S. Cl.
CPC . *B01L 2300/0896* (2013.01); *B01L 2400/043* (2013.01); *B01L 2400/0478* (2013.01)

(56) References Cited

U.S. PATENT DOCUMENTS

| | | | | |
|---|---|---|---|---|
| 5,075,079 | A * | 12/1991 | Kerr | G01N 35/00029 422/65 |
| 5,406,856 | A | 4/1995 | Kuhn | |
| 5,895,631 | A * | 4/1999 | Tajima | G01N 35/1065 436/526 |
| 5,947,167 | A * | 9/1999 | Bogen | F16K 15/144 141/130 |
| 6,070,779 | A * | 6/2000 | Baggerman | B23K 3/0607 228/1.1 |
| 6,387,330 | B1 * | 5/2002 | Bova | B01L 3/0268 177/60 |
| 7,900,850 | B2 | 3/2011 | Zengerle et al. | |
| 8,057,756 | B2 * | 11/2011 | Londo | G01N 35/1009 422/500 |
| 8,071,049 | B2 | 12/2011 | Koltay et al. | |
| 8,562,920 | B2 * | 10/2013 | Tajima | G01N 1/28 436/526 |
| 10,005,594 | B2 | 6/2018 | Tajima | |
| 10,058,859 | B2 | 8/2018 | Gehrig et al. | |
| 10,427,150 | B2 * | 10/2019 | Schraut | B01L 3/021 |
| 10,625,254 | B2 * | 4/2020 | Berberich | G01N 35/1072 |
| 2005/0208676 | A1 | 9/2005 | Kahatt | |
| 2006/0171854 | A1 * | 8/2006 | Koltay | B01L 3/0275 422/400 |
| 2007/0272710 | A1 | 11/2007 | Bui | |
| 2010/0047898 | A1 | 2/2010 | Bishop | |
| 2012/0288897 | A1 | 11/2012 | Ching et al. | |
| 2013/0061694 | A1 | 3/2013 | Saito et al. | |
| 2013/0153677 | A1 * | 6/2013 | Leen | B05B 17/0607 239/102.1 |
| 2013/0206857 | A1 * | 8/2013 | Ivri | B05B 17/0669 239/4 |
| 2015/0048119 | A1 * | 2/2015 | Boehm | G01N 35/1016 222/207 |
| 2015/0127157 | A1 * | 5/2015 | Matsukuma | B25J 9/0087 901/44 |
| 2016/0288117 | A1 | 10/2016 | Leen et al. | |
| 2016/0332156 | A1 * | 11/2016 | Tajima | B01L 3/0275 |
| 2017/0003203 | A1 * | 1/2017 | Heintzelman, Jr. | G01N 1/14 |
| 2017/0203322 | A1 | 7/2017 | Ivri et al. | |
| 2018/0333714 | A1 * | 11/2018 | Heintzelman | B01L 3/021 |
| 2022/0299441 | A1 * | 9/2022 | Fang | G01N 21/645 |
| 2024/0286138 | A1 * | 8/2024 | Lind | G01N 35/00069 |

FOREIGN PATENT DOCUMENTS

| | | | |
|---|---|---|---|
| EP | 1669762 | A1 | 6/2006 |
| JP | H06126198 | A | 5/1994 |
| JP | 2012500116 | A | 1/2012 |
| WO | 2005016534 | A1 | 2/2005 |
| WO | 2006076957 | A1 | 7/2006 |
| WO | 2006104311 | A1 | 10/2006 |
| WO | 2017009227 | A1 | 1/2017 |
| WO | 2018073074 | A1 | 4/2018 |

OTHER PUBLICATIONS

JPO Notice of Allowance Dated Oct. 23, 2023.

* cited by examiner

LIQUID-METERING DEVICE FOR BALLISTICALLY DISCHARGING METERED AMOUNTS IN THE NANOLITER RANGE, LIQUID-METERING METHOD AND PIPETTING TIP THEREFOR

CROSS-REFERENCE TO RELATED APPLICATIONS

This application is the National Stage of International Application No. PCT/EP2019/083280, filed on Dec. 2, 2019, which claims the benefit of German Application No. 10 2018 131 088.9, filed on Dec. 5, 2018. The entire contents of both applications are hereby incorporated herein by reference.

BACKGROUND OF THE INVENTION

The present invention relates to a liquid-metering device for ballistically discharging a 5 discrete dosage amount of a dosage liquid in a dosage volume range of 0.3 nl to 900 nl from a dosage liquid supply, comprising:

- a pipetting-tip mounting device defining in at least one ready-to-meter operating position of the liquid-metering device a mounting space extending along a virtual mounting axis that is configured to accommodate a portion of the pipetting tip (i.e., an accommodation space),
- a release tappet (also called herein a “triggering plunger”) movable relative to the pipetting-tip mounting device, which can be displaced between a standby position more retracted from the mounting space to a release position more projecting into the mounting space,
- a displacement drive having a motion-transmitting coupling to the release tappet, configured to intermittently displace the release tappet, at least from the standby position to the release position, and
- a control device connected to the displacement drive for controlling the operation of the displacement drive based on signal transmission.

Such a liquid-metering device is known from WO 2006/076957 A1. This patent discloses a method to mount pipetting tips specially configured for this liquid-metering device, comprising a tube or pipe section at their lengthwise metering end in a pipetting-tip mounting device. The lengthwise metering end features a metering orifice for metering the liquid.

The short mechanical impulses exerted by the release tappet on the specially configured tube or pipe section of the pipetting tip cause the discharge of discrete dosage liquid amounts in the nanoliter (nl) range from the tube or pipe section. The tube or pipe section preferably features a substantially constant cross-section in terms of size and shape, preferably along a tube or pipe axis. The dosage amount discharged by the mechanical impulse transfer covers a distance in free flight as a metered drop, which is the reason for referring to this metering method as “ballistic”.

The other lengthwise end of the pipetting tip features a coupling formation that is configured to be coupled to the pipetting channel of a pipetting device. The latter lengthwise end is therefore subsequently referred to as the “lengthwise coupling end”.

The known pipetting tip extending along a virtual tip axis features a reservoir chamber arranged axially to the tip axis between the lengthwise coupling end and the tube or pipe section near the lengthwise metering end, in which a dosage liquid supply can be held.

The function of the known liquid-metering device relies on the incompressibility of dosage liquids. The mechanical impacts exerted in very short intervals by the release tappet on the tube or pipe section close to the lengthwise metering end transmit mechanical impulses to the tube or pipe section filled with dosage liquid. Due to the incompressibility of the dosage liquid contained in the tube or pipe section, the mechanical impulse on said section induces a pressure impulse in the dosage liquid, which causes the discharge of a drop in the area of the metering orifice.

In principle, a pressure wave induced by the mechanical impulse in the dosage liquid spreads in two opposite directions along the tip axis in the dosage liquid. The dosage liquid supply within the reservoir chamber, which represents a large inert mass compared to the smaller dosage liquid amount contained in the tube or pipe section, rests above the tube or pipe section in an axial direction extending in the direction of the lengthwise coupling end. The mechanical impulse at the metering orifice, as the place of least mechanical and fluid resistance, therefore causes a detachment of a discrete dosage amount that discharges from the pipetting tip in axial direction.

Changing the time interval of the mechanical impulse and displacing the release position of the release tappet allows for specifically modifying the dosage amount discharged through the metering orifice during a mechanical impulse transmission of the dosage liquid in the tube or pipe section.

The disadvantage of the known liquid-metering device is the need to use specially configured pipetting tips, namely those featuring a tube or pipe section as described, and having a substantially constant, small cross-section between the open metering orifice and the reservoir chamber.

Further technical background details on metering liquids in the nanoliter range with mechanical impulse transmission on a tube or pipe section can also be found in WO 2005/016534 A1.

Based on the above considerations regarding the state of the art, the problem of the present invention is to teach a design that improves the aforementioned liquid-metering device in such a way that it can be operated with commercially available pipetting tips, which do not need to be specially configured for using the liquid-metering device. In particular, the technical teaching of the present invention is to enable the use of commercially available pipetting tips that feature a metering orifice that is not arranged at the free end of a tube or pipe section with constant and, compared to the remaining cross-sections of the pipetting tip outside of the tube or pipe section, small cross-sections with a cross-sectional area in the range of 0.075 to 0.75 $mm^2$ and a length of more than 2 mm.

Commercially available, conventional pipetting tips typically taper continuously along their tip axis to the metering orifice, from their lengthwise coupling end or from a location situated more closely to the lengthwise coupling end than to the lengthwise metering end. The tapered section in many cases has a conical design. Such a conventional pipetting tip may feature areas with different taper angles along its axial extension.

Commercially available, conventional pipetting tips may feature a short cylindrical band at the lengthwise metering end, which is formed between the tapering section situated between the lengthwise metering end and the lengthwise coupling end and the metering orifice. However, this band is shorter than 2 mm and therefore unsuitable for transmitting a mechanical impulse. Conventional pipetting tips are preferably tapered directly to the metering orifice.

SUMMARY OF THE INVENTION

The present invention solves the above problem with a device aspect of a liquid-metering device of the aforementioned type, which comprises a first and a second deformation formation, wherein the first and second deformation formation define between them an axial longitudinal section of the mounting space, extending along the virtual mounting axis, as a deformation area, in which the first and second deformation formation can be converged and retracted from each other to deform a pipetting tip in the mounting space. The release tappet in its release position is located within the deformation area of the mounting space.

The basic idea of the present invention is to deform an axial portion of conventional pipetting tips, which do not feature a section designed for mechanical impulse transmission for the purpose of discharging a discrete dosage volume, in such a way, based on the two deformation formations of the liquid-metering device as a deformation portion, that the thus deformed portion of the pipetting tip can be used for dispensing dosage volumes in the nanoliter range via mechanical impulse transmission through the release tappet.

In this manner, a pipetting tip of any original shape or design can be deformed, at least in portions, for a specific time interval through deformation caused by the relative convergence of the first and second deformation formation to create a shape, in which the release tappet can intermittently exert a mechanical impulse on the deformation portion of the pipetting tip, which causes the discharge of a discrete dosage volume from the dosage liquid supply of the pipetting tip through its metering orifice in the known manner.

The liquid-metering device of the present invention substantially differs from the aforementioned state of the art by the first and second deformation formation so that it initially does not matter for the definition of the liquid-metering device whether a pipetting tip is actually included in the pipetting-tip mounting device or whether the pipetting-tip mounting device is only configured to hold a pipetting tip.

The release tappet in its release position is located in the deformation area of the mounting space that effects a deformation of a fitted pipetting tip to ensure that the release tappet can exert the mechanical impulse releasing the dosage volume in the portion of the pipetting tip fitted in the pipetting-tip mounting device where the pipetting tip is deformed or deformable in such a way that the transmission of the mechanical impulse from the release tappet to the deformation area can cause a dosage volume to be dispensed in the nanoliter range.

For the simple handling of the liquid-metering device and in particular, for the simple loading of the pipetting-tip mounting device with an unused and therefore, undeformed, pipetting tip, a preferred further development of the present invention provides that the first and second deformation formation are movable relative to each other between a further retracted loading position, in which the pipetting-tip mounting device is configured to fit a pipetting tip into the pipetting-tip mounting device and/or to retrieve a pipetting tip from the pipetting-tip mounting device, and a more converged deformation position, in which a portion of a pipetting tip fitted into the mounting space located in the deformation area is deformed by the first and second deformation formation.

An undeformed conventional pipetting tip, which typically extends along a virtual tip axis between its lengthwise coupling end and its lengthwise metering end does not permit the metering of volumes in the nanoliter range by mechanical impulses transmitted from the outside due to undesirably high inner friction within large dosage liquid volumes in its reservoir chamber compared to the dosage volume. Rather, this type of liquid metering is made possible by liquid chambers, which feature a narrow inside width of about 1 mm or less in at least one spatial direction extending orthogonally to the tip axis so that a pressure wave mechanically induced from the outside in such a narrow liquid-metering area can spread along the axis of the pipetting tip and cause the discharge of a drop from the provided dosage liquid supply when it reaches the meniscus near the metering orifice.

The inside width between the first and second deformation formation in the deformation position is preferably smaller, in at least one spatial direction extending orthogonally to the mounting axis, in the deformation area than in axial relation to the virtual mounting axis of the mounting space areas located on both sides of the deformation area. That makes the deformation area distinguishable from the remaining mounting areas and recognizable as a deformation area. The deformation area thus forms, in the at least one spatial direction extending orthogonally to the mounting axis, a bottleneck in the mounting space.

When the pipetting-tip mounting device is loaded with a pipetting tip, the virtual tip axis and the virtual mounting axis are parallel or preferably collinear.

Since, for the aforementioned reasons, the ballistic discharge through a mechanical impulse only functions particularly well when a pipetting tip fitted into the mounting space is deformed by the deformation formations in the deformation area to create a narrow liquid chamber as detailed above, meaning that the first and second deformation formation are in their converged deformation position, the control device is preferably designed to only drive the release tappet to displace from the standby position to the release position if the first and second deformation are in the deformation position.

As described above, the deformation area in the mounting space is changed in such a way during the course of a relative convergence of the first and second deformation formation that a portion of the pipetting tip fitted therein features a shape that enables dispensing a dosage liquid in the nanoliter range caused by the external transmission of a mechanical impulse by means of the release tappet. The shape change caused by the two deformation formations in the mounting space is thus a deformation of the pipetting tip that prepares it for metering. It is therefore preferable for the liquid-metering device to deform, in the deformation area, a portion of a pipetting tip fitted in the mounting space for a deformation interval, which is comparably longer than the displacement interval of the motion that displaces the release tappet from the standby position to the release position. Since the liquid-metering device discussed herein is also capable of aliquot operation, in which the release tappet is intermittently moved multiple times into the release position within the deformation area, the deformation interval defined by the arrangement of the first and second deformation formation in the deformation position lasts at least several seconds, preferably at least a minute, while the displacement of the release tappet from the standby position to the release position takes less than 1 second, preferably less than 0.25 seconds, and most preferably less than 0.05 seconds. The deformation interval thus lasts at least three times and most preferably at least thirty times longer than the displacement interval.

In a preferred embodiment, the release tappet is not only displaced from the standby position to the release position, but immediately returned from the release position back to the standby position so that the release tappet does not remain in the release position, but rather, the release position only represents a reversal dead center point in the release displacement of the release tappet.

The control device or/and the displacement drive can be configured to hold the release tappet in the release position for a pre-defined or pre-definable interval before it begins to return to the standby position.

The liquid-metering device may feature an input/output device in order to transfer or manually enter data, retrieve data or generate data output, for example the aforementioned holding interval of the release tappet in the release position or one or more operating parameters for metering.

In principle, the release tappet may be configured separately from the first and second deformation formation, which facilitates low-mass design of the release tappet and subsequently simplifies its acceleration to high displacement speeds in a short time.

Since the release tappet is to be force-transmitting in the deformation area of the mounting space defined by the first and second deformation formation, it is preferred for the release tappet to be at least a part of the first deformation formation because it is already arranged at the deformation formation. To reduce the number of components required for creating the liquid-metering device, the release tappet preferably is the first deformation formation. In this way, the release tappet can initially contribute to deforming the pipetting tip fitted in the mounting space and can then, when the first and second deformation formation are in the deformation position, be displaced intermittently to the release position relative to the second deformation position. The position of the release tappet taken up within the deformation position relative to the second deformation formation is then preferably the standby position.

In principle, the release tappet can be movable in a first deformation motion to deform a pipetting tip fitted into the mounting space so that the pipetting tip is deformed by a motion of the release tappet from an even further retracted initial position in the mounting space to its standby position. After reaching the standby position, the release tappet can then be displaced intermittently to the release position to ballistically discharge a dosage amount. However, the release tappet preferably can only be displaced between the standby position and the release position.

To safely a fit the pipetting tip into the mounting space with a clear orientation, the second deformation formation, which preferably is configured relative to the release tappet in a direction extending orthogonally to the mounting axis, may comprise a wall section restricting the mounting space. This wall section can be adjoined by an outer wall section of a pipetting tip, for example fitted together, when the first and second deformation formation are moved relative to each other from the loading position to the deformation position.

For the safe and clearly defined position of a pipetting tip in the mounting space of the pipetting-tip mounting device, the pipetting-tip mounting device may comprise a first device portion situated more closely to the release tappet and a second device portion further removed from the release tappet. The first or second device portion may, additionally to the release tappet, cause the deformation of a pipetting tip fitted into the mounting space, for example to locally increase a flow resistance of the pipetting tip along the tip axis. For this purpose, the first and/or the second device portion may comprise a constricted section at an axial distance from the release tappet relative to the mounting axis, wherein the mounting space, at least in the deformation position, has a smaller cross-section than directly on both sides of the constricted section in axial direction. The aforementioned first deformation formation thus may comprise both the release tappet and the, preferably first, device portion having the constricted section.

For easily achievable and serviceable kinematics, the first device portion may have a stationary configuration relative to a device framework of the liquid-metering device, meaning it is affixed to the framework. To move the first and the second device formation relative to each other and between the loading position and the deformation position, it is then advantageously sufficient for the second device formation to be retractable from the first device formation affixed to the framework and to be converged thereto. The release tappet in its standby position preferably is also affixed to the framework. In that case, the deformation motion is only carried out by the second device portion and the release displacement is only carried out by the release tappet.

A spatially compact pipetting-tip mounting device with minimal space requirements can be obtained by a configuration in which the first device portion is penetrated or penetrable by the release tappet. The second deformation formation can advantageously be arranged at the second device portion.

In principle, the two deformation formations can be movable manually between their loading position and their deformation position, wherein the liquid-metering device preferably features a formation guiding the two device formations relative to each other to move between the loading position and the deformation position.

For increased productivity, the liquid-metering device may feature an actuating drive, which drives the two deformation formations relative to their motion in at least one, preferably in both, directions between the loading position and the deformation position. As described above, it is preferable for only the second deformation to be coupled to the actuating drive. When the pipetting-tip mounting device features the above-described second device portion, the liquid-metering device preferably comprises an actuating drive coupled to the second device portion, through which the second device portion can be moved from an open position further removed from the first device portion and a closed position more closely converged to the first device portion. When the second deformation formation is arranged at the second device portion, the first and second deformation formation are preferably in the loading position relative to each other when the second device portion is in the open position, and in the deformation position when the second device portion is in the closed position.

To prevent the need to supply the actuating drive with current or generally with energy for the entire duration of deforming the pipetting tip in the deformation area of the mounting space, the second device portion may be pre-tensioned in one of its positions. Preferably the second device portion is pre-tensioned in the closed position so that a pre-tensioning device providing pre-tension, such as a mechanical or/and pneumatic or/and hydraulic spring arrangement, also provides the deformation force through which sections of a pipetting tip fitted into the mounting space are deformed. The actuating drive in that case only needs to briefly be supplied with energy to move the second device portion into the open position or the first and second deformation formation into the loading position relative to each other.

The release tappet may also be pre-loaded with a pre-loading device in one of its positions, for example with a mechanical or/and pneumatic or/and hydraulic spring arrangement as well. The release tappet is preferably pre-tensioned in the standby position so that it only needs to be displaced intermittently into the release position by the displacement drive against the pre-tensioning force of the pre-tensioning device and is immediately returned to its standby position after reaching the release position when the displacement drive is turned off. This achieves a particularly short displacement time interval and an especially short dwelling time of the release tappet in the release position.

For the most precise impulse transfer from the release tappet to a deformation portion of a pipetting tip fitted into the mounting space, the release position of the release tappet can be defined by a mechanical stop. Preferably, the stop is adjustable along the displacement trajectory of the release tappet to adjust the liquid-metering device to various dosage liquids and/or various dosage amounts. The displacement path of the release tappet can therefore also be modifiable.

An especially effective impulse transfer from the release tappet to a deformation portion of a pipetting tip can be achieved when a displacement trajectory, along which the release tappet can be displaced between its standby position and its release position, forms an angle in the range of 70 to 110 degrees with the virtual mounting axis. Preferably, this angle is a right angle so that the release tappet impacts the deformation portion of a pipetting tip orthogonally to the tip axis, which is at least parallel and preferably collinear to the mounting axis.

For the effective use of an available deformation force for deforming a pipetting tip fitted into the mounting space, a preferred embodiment of the present invention comprises a motion trajectory, along which the first and second device portion can converge, wherein the motion trajectory forms an angle in the range of 70 to 110 degrees with the virtual mounting axis. A right angle is also preferable because it advantageously avoids deformation portions exerting forces along the mounting axis or tip axis.

Accordingly, the displacement trajectory and the motion trajectory are situated, at least in portions and preferably completely, in two parallel planes or in a shared plane. An advantageously slim liquid-metering device with a narrow operating space to accommodate the movable components can be achieved by a configuration in which the displacement trajectory and the motion trajectory are parallel to each other.

Although the aforementioned liquid-metering device was defined without a replaceable pipetting tip and the pipetting tip was only mentioned in the context of facilitating a description of the deforming interaction of the liquid-metering device with the pipetting tip, it should not be ruled out for the liquid-metering device to comprise a pipetting tip. Such a pipetting tip has a lengthwise coupling end with a coupling formation, which is configured to couple to a pipetting channel of a pipetting device and a lengthwise metering end opposite to the lengthwise coupling end, through which the discrete dosage amount can be discharged. The pipetting tip further features a reservoir chamber between the lengthwise coupling end and the lengthwise metering end, in which the dosage liquid supply can be arranged. For advantageous further developments of the liquid-metering device pipetting tip, the aforementioned characteristics of conventional pipetting tips apply as well.

As mentioned above, the pipetting tip extends along a virtual tip axis between its lengthwise coupling end and lengthwise metering end. When fitted in the mounting space, the pipetting tip protrudes axially over the deformation area in relation to the tip axis, preferably on both sides. That means that undeformed pipetting tip sections adjoin the deformation portion of the pipetting tip actually deformed by the first and second deformation formation along the tip axis. These are preferably rotationally symmetric to the tip axis as a rotational symmetry axis, at least in sections. To avoid a deformation of the coupling formation required for coupling to a pipetting channel of a pipetting device by the deformation formations, the reservoir chamber preferably protrudes axially over the deformation areas on both sides.

The pressure wave induced by the release tappet in the dosage liquid of the deformed pipetting tip spreads in all directions from the impact location of the release tappet to a deformation portion of the pipetting tip arranged within a deformation area of the mounting space. The pressure wave is attenuated along its path by internal friction within the dosage liquid. To achieve a ballistic discharge of the desired dosage amount in the nanoliter range with the release tappet as safely and reproducibly as possible, it is advantageous for the deformation area to be arranged more closely to the lengthwise metering end than to the lengthwise coupling end. That enables the pressure wave to reach the meniscus of the dosage liquid that is closer to the metering orifice with minimal attenuation. Preferably the deformation area is situated completely within the half of the axial pipetting tip extension area that emanates from the lengthwise metering end.

In its retracted state within the mounting space, the pipetting tip features a deformation area located within the mounting space having two opposing inside wall surface sections with a gap on the inside of the pipetting tip, wherein the first and second deformation formation are in their deformation position. The gap created by the deformation formations at the pipetting tip features, in a direction orthogonal to the tip axis, a gap width of at least 20 μm, preferably at least 50 μm, and most preferably at least 70 μm. Furthermore, the gap width does not exceed 900 μm, preferably 500 μm, and most preferably 200 μm. A gap width of 100 μm has proven particularly advantageous in tests. Such a gap limited to the above dimensions forms the necessary aforementioned narrow liquid-metering chamber for virtually all dosage liquids, in which pressure waves can be induced by way of mechanical impulse transfer via the release tappet to cause the discharge of the desired small dosage amount at the lengthwise metering end.

Although the specific shape of the gap and the inner wall surfaces forming the same within the pipetting tip can be freely selected from the aforementioned dimensions, the opposing interior wall surfaces along the gap width are preferably level and/or parallel to each other to achieve metering results with high accuracy and repeat precision, especially for aliquoting.

To ensure the safe transmission of the mechanical impulse from the release tappet to the deformation portion and from there to the dosage liquid in the pipetting tip, the release tappet makes contact with the deformation portion of the pipetting tip in its release position. The release tappet may be in contact with the deformation portion before reaching the release position so that the release tappet causes a brief deformation from the time of contacting the deformation portion to reaching the release position. This release deformation, which has a significantly shorter duration than the deformation of the deformation portion by the deformation formations, adds a brief time interval, approximately in the double-digit or low three-digit millisecond range, to the latter deformation preparing for the metering process.

The release deformation preferably is an exclusively elastic deformation. The deformation preparing for the metering process preferably comprises a plastic deformation element due its comparably higher level of deformation and longer deformation interval compared to the release deformation.

The aforementioned problem is also solved by another aspect of the present invention, namely a pipetting device having a pipetting channel extending along a virtual channel trajectory, which is filled at least partly with a working fluid differing from the dosage liquid and which features at its free lengthwise end a coupling formation for the temporary, detachable coupling of a pipetting tip thereto, wherein said pipetting device further comprises:

- a pressure-adjustment device configured to modify the pressure of the working fluid in the pipetting channel,
- a pressure sensor for recording the pressure of the working fluid, configured and arranged in the pipetting channel,
- a pipetting control device connected to both the pressure sensor and the pressure-adjustment device through signal transmission for controlling the pressure-adjustment device operation, which is configured to control the operation of the pressure-adjustment device at least in accordance with an actual working fluid pressure measured by the pressure sensor, and
- a liquid-metering device according to one of the preceding claims, wherein the channel trajectory virtually extending from the pipetting channel is parallel or collinear to the mounting axis.

The pipetting device comprises a liquid-metering device in accordance with the aforementioned description, wherein the pipetting tip with its coupling formation is coupled, or can be coupled, to the coupling feature of the pipetting channel, and wherein the pipetting control device is further configured to control the operation of the pressure-adjustment device, at least in accordance with an actual working fluid pressure measured by the pressure sensor, preferably taking into account at least a specified target working fluid pressure value. This arrangement allows for maintaining a reliable, long-lasting aliquoting operation with a plurality of aliquoting cycles, since the pipetting control device with the corresponding actuation of the pressure-adjustment device based on the mechanical impulse transmission from the deformation portion can resupply the dosage liquid from a dosage liquid supply situated axially between the coupling formation and the deformation portion in the deformation portion.

The aforementioned problem is further solved by another aspect of the present invention, namely a pipetting tip for use in a liquid-metering device configured as described above, which extends along a virtual tip axis, whereby the pipetting tip comprises:

- a lengthwise coupling end with a coupling formation that is configured to be coupled to the pipetting channel of a pipetting device,
- a lengthwise metering end having a metering orifice, arranged at an axial distance from the lengthwise coupling end in relation to the tip axis, through which a discrete dosage amount can be discharged from a dosage liquid supply held in the pipetting tip,
- a reservoir chamber between the lengthwise coupling end and the lengthwise metering end, in which the dosage liquid supply can be arranged.

A portion of the pipetting tip, arranged as a deformation portion between the metering orifice and the coupling formation, features two opposing interior wall surface sections across a gap on the inside of the pipetting tip, wherein said gap in a first, larger extension direction, extending orthogonally to the tip axis and parallel to the opposite interior wall surface sections, has an inside width that is at least five times, preferably at least ten times, and most preferably at least 50 times larger than that of a second, smaller extension direction that extends orthogonally both to the tip axis and to the first extension direction. Such a pipetting tip is configured for use in the aforementioned liquid-metering device, regardless of whether the deformation portion is formed at the pipetting tip prior to fitting the pipetting-tip mounting device in the mounting space or whether it is generated by deformation via the first and second deformation formation.

To enable the gap formed in the deformation portion of the pipetting tip to transmit a pressure wave induced by the release tappet to cause the ballistic discharge of a dosage amount in the nanoliter range to the dosage liquid meniscus configured more closely to the metering orifice, it is advantageous for the dimension of the gap along the tip axis to have at least 0.5 times the maximum inside width along the first extension direction.

Likewise, the dimension of the gap should not exceed 0.8 times, preferably 0.5 times, and most preferably, one third of the axial pipetting tip length to ensure the functionality and above all, the coupling ability of the pipetting tip to a pipetting channel of a pipetting device. This arranges the coupling formation at a sufficient distance from the deformation portion to prevent unintended deformation.

As described above, the pipetting tip preferably comprises, on at least one axial side (relative to the tip axis), a rotationally symmetric deformation portion and preferably a rotationally symmetric axial body portion, respectively, on both sides of the deformation portion. In order to have a sufficient size for mechanical impulse transmission and the resulting induction of a pressure wave in the dosage liquid within the deformation portion, the deformation portion may protrude radially, along the first extension direction, over at least one axially adjoining body portion of the pipetting tip relative to the tip axis. For reasons of symmetry, the deformation portion preferably protrudes radially in each of the two opposite radial directions, over a body portion axially adjoining the deformation portion.

As explained above, the gap formed in the deformation portion is preferably thin, having a width of less than one millimeter. This enables a body portion of the pipetting tip, axially adjoining the deformation portion relative to the tip axis, to radially protrude over the deformation portion along the second extension direction. Preferably each of the two body portions axially adjoining the deformation portion on both sides protrude radially over the deformation portion along the second extension direction.

The above problem is solved by a method aspect of the present invention with a method for ballistically discharging discrete dosage amounts of a dosage liquid in a dosage volume range of 0.3 nl to 900 nl from a dosage liquid supply, comprising the following steps:

Provision of a pipetting tip extending along a virtual tip axis having a coupling formation formed on the axial lengthwise end, in relation to the tip axis, for coupling to a pipetting device with a metering orifice arranged at an axial distance from the coupling formation for discharging the dosage amount, wherein a reservoir chamber is located between the coupling formation and the metering orifice for holding the dosage liquid supply.

Holding a dosage liquid supply in the reservoir chamber,

Deformation of a portion of the reservoir chamber by converging the interior wall surface sections of the reservoir chamber arranged at a distance from each other with a converging component extending orthogonally to the tip axis, thus resulting in the formation of a deformation portion of the pipetting tip.

While the deformation portion is formed and while dosage liquid is held between the interior wall surface sections situated opposite from each other: application of an intermittent impulse on the deformation portion, propelling the dosage amount of dosage liquid through the metering orifice, wherein the duration of the impulse transmission is short compared to the duration of the deformation of the deformation portion.

The step of exerting the intermittent impulse comprises a sufficient further deformation of the deformation portion by way of the deformation preparing for the metering process of the reservoir chamber section to create the deformation portion via the first and second deformation formation, wherein the further deformation interval of the deformation portion is no longer than a third, preferably no longer than one-tenth of the deformation interval preparing for the metering process to form the deformation portion.

The method according to the invention is detailed in the above description of the liquid-metering device according to the invention, in which the method is preferably performed.

In its embodiment with the smallest dosage volume, dosage amounts of 0.3 nl up to 5 nl can be metered in a repeatable manner. Slightly larger dimensions, for example for the gap in the deformation portion of the pipetting tip, allow for dosage amounts in the range of 5 nl to 20 nl with repeatable accuracy. A sturdier embodiment of the liquid-metering device can precisely dispense dosage amounts in the range of 20 nl to 70 nl. Likewise, a liquid-metering device can accurately dispense dosage amounts in the range of 70 nl up to 500 nl as individual drops. Although amounts in the range of 500 nl to 900 nl are also feasible with precision, the dosage liquid amount may form a core drop and separate satellite drops, which is not always acceptable.

BRIEF DESCRIPTION OF THE DRAWING FIGURES

Figure 2:
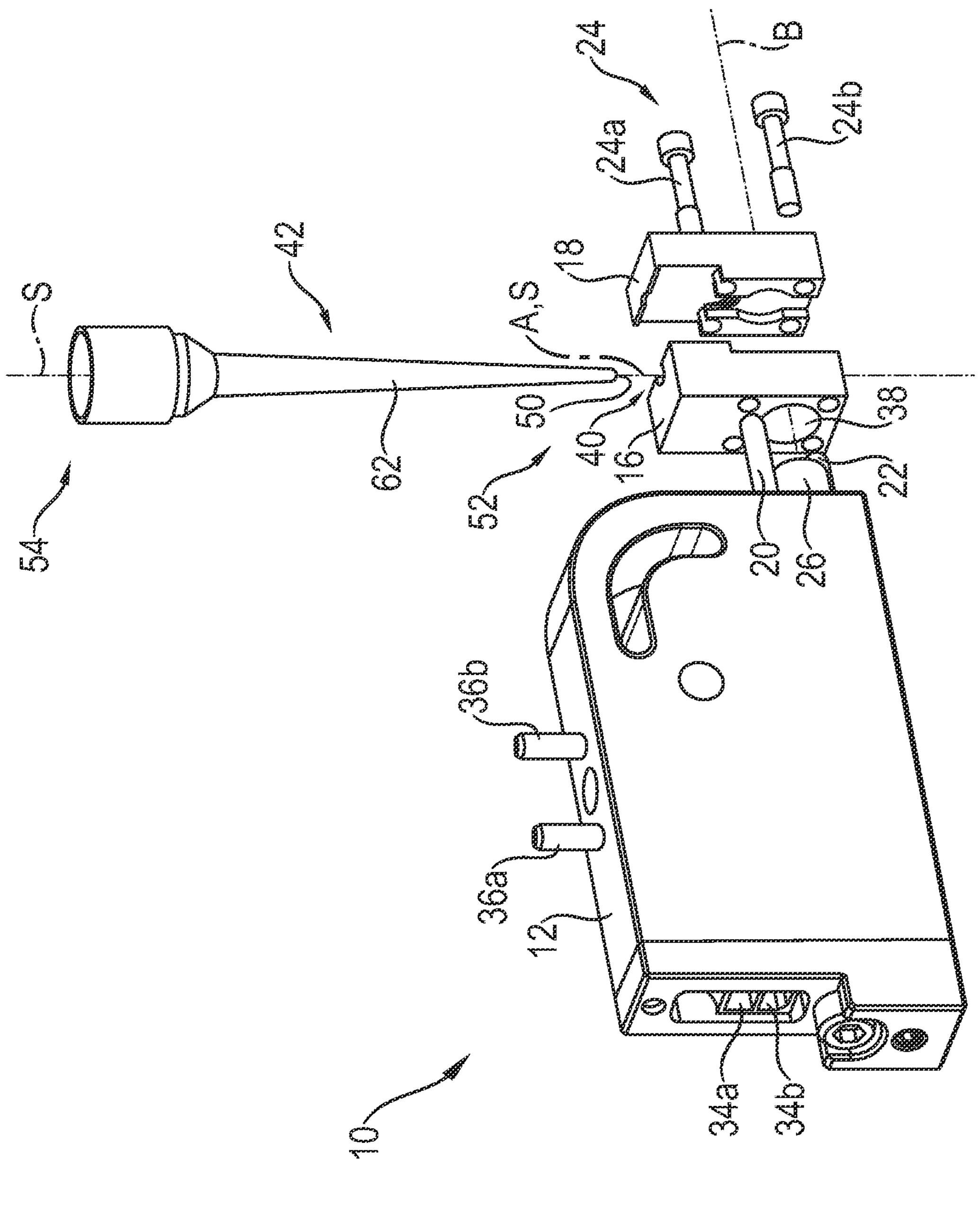
Figure 3:
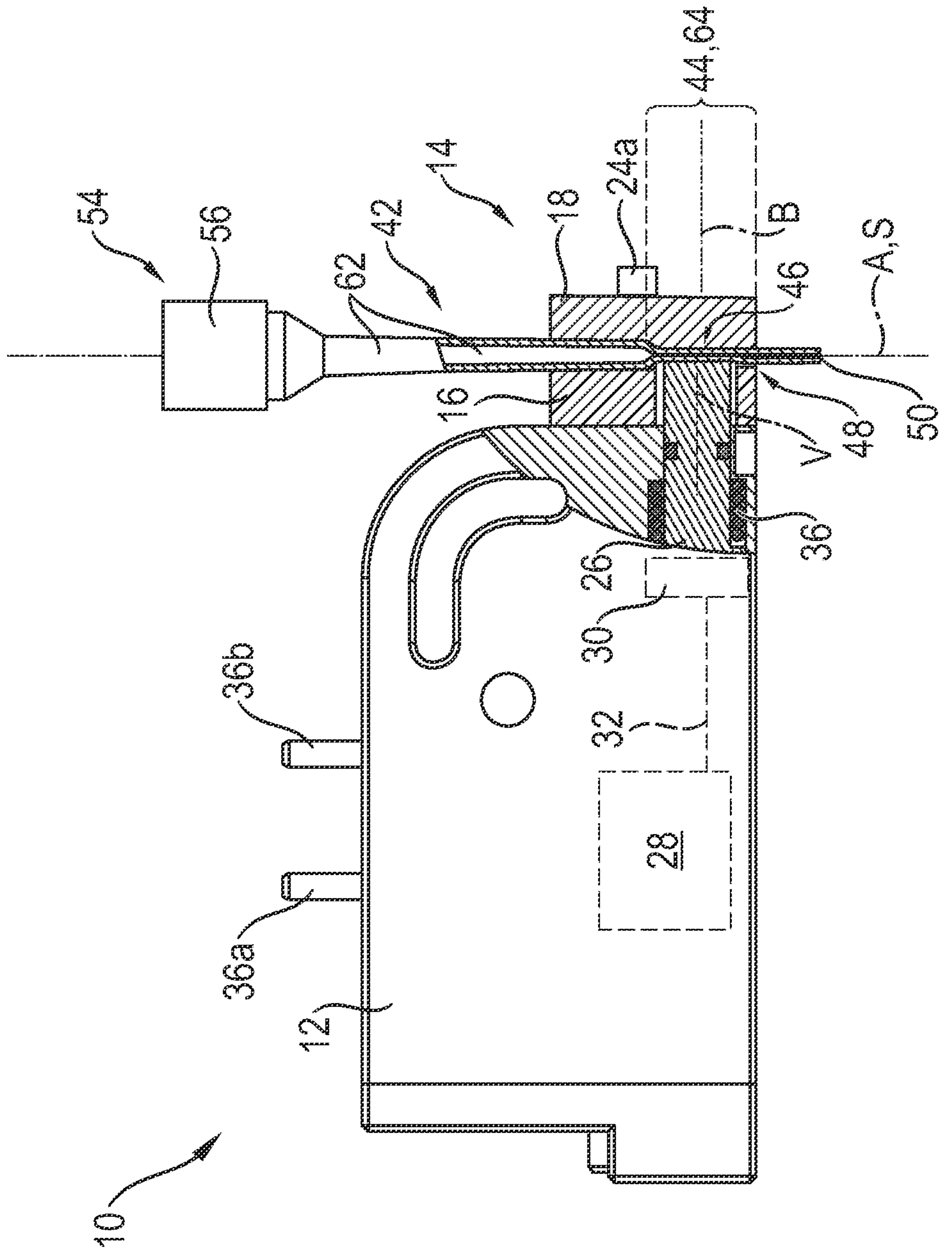
Figure 4:
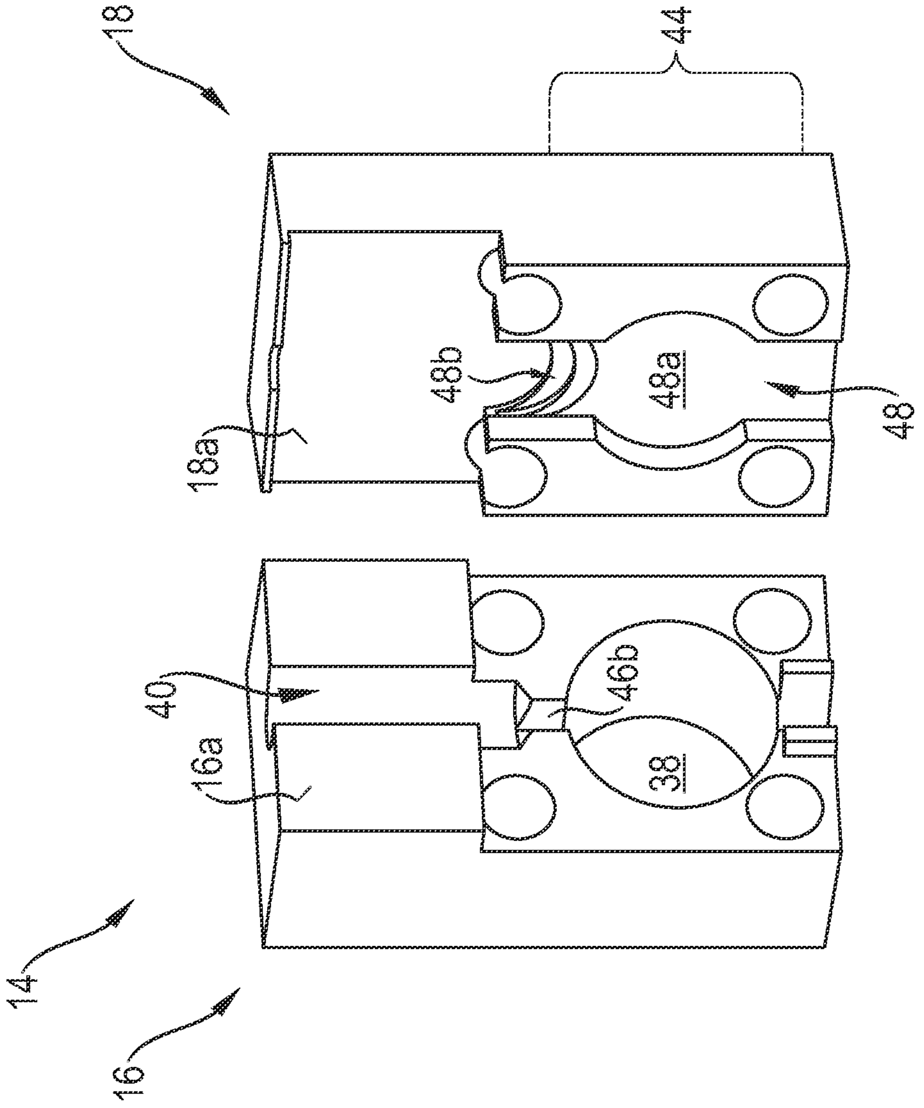
Figure 5:
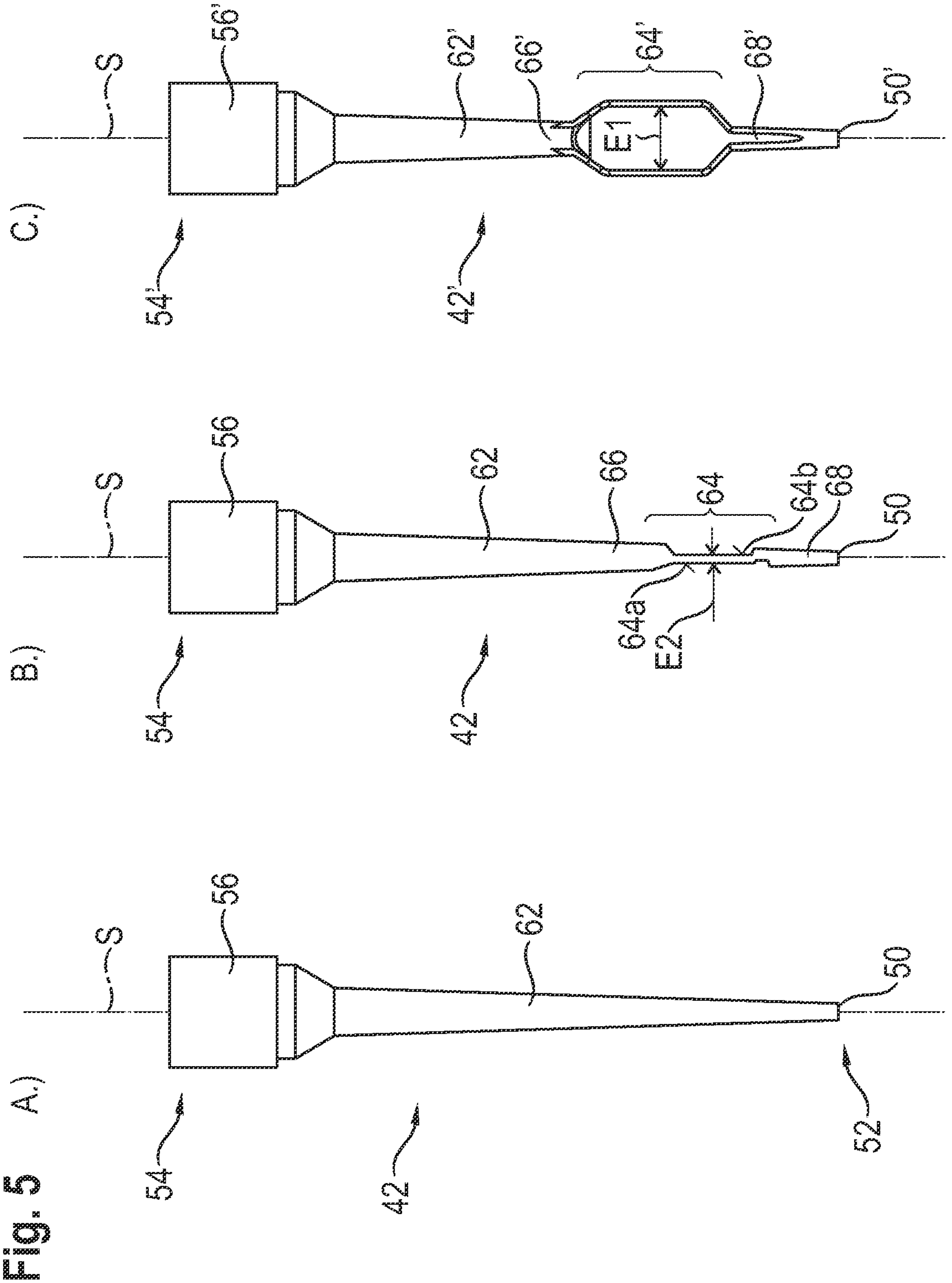

The present invention is described in greater detail based on the attached drawings. They show the following:

FIG. 1 A lateral view of an embodiment according to the invention of a liquid-metering device having a pipetting tip, wherein a first and second device portion of the liquid-metering device are shown in an exploded view as separated from the main body of the device and wherein the pipetting tip is coupled to a pipetting channel of a pipetting device, FIG. 2 A perspective view of the embodiment of FIG. 1 without a pipetting device, FIG. 3 The embodiment in the view of FIG. 1, with the first and second deformation formation in deformation position, also without a pipetting device, FIG. 4 The first and second device portion used in FIGS. 1 to 3, showing a perspective view of its opposing surfaces in operation, FIG. 5A View of a conventional, undeformed pipetting tip, FIG. 5B Lateral view of the pipetting tip of FIG. 5A, in a condition deformed by the first and second deformation formation, FIG. 5C Pipetting tip of FIG. 5A in deformed condition, in a frontal view of the deformation portion.

DETAILED DESCRIPTION OF THE PREFERRED EMBODIMENTS

In FIGS. 1 to 3, an embodiment according to the invention of a liquid-metering device is generally labeled as 10. The liquid-metering device 10 comprises a housing 12, generally fully mounted for operation, for example affixed to a frame, on which a pipetting-tip mounting device 14 is arranged.

In the embodiment shown herein, the pipetting-tip mounting device 14 comprises a first device portion 16, generally affixed to a housing or frame, and a second device portion 18 being movable in relation thereto.

The motion of the second device portion 18 is guided by guiding devices, for example two parallel guide rods 20 and 22, which penetrate the first device portion 16. The second device portion 18 can be moved along a motion trajectory B parallel to the drawing plane of FIG. 1 between an open position further removed from the first device portion 1 (see for example FIGS. 1 and 2) and a closed position arranged more closely to the first device portion 16 (see FIG. 3).

The liquid-metering device 20 features two manually operable screws 24*a* and 24*b* as the actuating drive 24 of the second device portion 18, at least from the open position to the closed position. The second device portion 18 can be converged toward the first device portion 16 with a defined force, using screws 24*a* and 24*b*, up to the closed position. In the opposite rotational direction, the second device portion 18 is at least movable along the motion trajectory B in the direction emanating from the first device portion 16. This permits an operator to perform a manual operating intervention at the second device portion 18 by moving the second device portion 18 from the closed to the open position.

As the average skilled person will easily understand, the actuating drive 24 may feature an actuator instead of the screws 24*a* and 24*b* shown in this example, wherein said actuator may be coupled to the second device portion along the motion trajectory B for joint motion. For example, the actuating drive 24 may be a pneumatically or hydraulically actuated drive having a piston rod or multiple piston rods that are coupled to the second device portion for joint motion. Alternatively, the actuating drive 24 may be an electric motor drive, for example a spindle drive, to reflect the operating principle of the screws 24*a* and 24*b* shown as examples. To this end, a threaded rod of the spindle drive with a female thread may be connected to an opening penetrating the second device portion 18 parallel to the motion trajectory B in such a way that the second device portion functions as a nut, which, in case of rotation of the at least one threaded rod, is moved along the motion trajectory B along the longitudinal threaded rod axis in accordance with the speed and pitch of the threading used on the threaded rod.

In contrast to the kinematics described above, the first device portion 16 can be actuated by an actuating drive along the motion trajectory B in addition to the second device portion 18, although this would only increase the number of actuating drives to be configured without yielding significant further benefits.

As an alternative, the second device portion 18 may be affixed to a housing or frame and only the first device portion 16 may be movable along the motion trajectory B by an actuating drive.

The further functions and effects of the first and second device portions 16 and 18 are discussed in greater detail below in the context of FIG. 4, but the operating principle of the liquid-metering device 10 will be explained first.

The liquid-metering device 10 comprises a release tappet 26, which can be moved along a displacement trajectory V between a standby position further retracted into the housing 12 and a release position further projecting from the housing 12. The displacement trajectory V and the motion trajectory B are preferably collinear or at least parallel.

The stroke of the release tappet 26 between the two aforementioned operating positions is significantly smaller than the relative motion path of the first device portion 16 and the second device portion 18 along the motion trajectory B between their operating positions: open and closed position. While the relative motion path of the first and second device portion 16 and 18 is at least in the single-digit millimeter range, the stroke of the release tappet 26 between the aforementioned operating positions, i.e., standby position and release position, is generally less than 50 μm, preferably less than 40 μm and most preferably less than 36 μm. The information on the stroke of the release tappet as well as on the relative motion path of the first and second device portion 16 and 18 not only applies to the sample embodiment of the present invention as shown in FIGS. 1 to 3, but generally to the liquid-metering device of the present invention. The stroke of the release tappet is preferably always smaller, at least by a factor of about 5 smaller than the motion path of the device portions 16 and 18 between their operating positions.

To control the motion of the release tappet 26, the liquid-metering device 10 features a control device 28, which is only shown in FIGS. 1 and 3 as a dotted line in the housing 12 for reasons of clarity. The control device 28 has a signal transmission connection with a displacement drive 30, shown as a piezoelectric actuator in this example, through a wire 32.

The terminals 34*a* and 34*b* are able to transmit energy, in this example electrical energy through terminal 34*a*, as well as data, in this example through terminal 34*b* in the form of an RJ45 port to the inside of housing 12. The energy can be supplied to the piezoelectric actuator of the displacement drive 30 as actuating energy through the control device 28 via wire 32. In this manner, the release tappet 26 can be displaced, against the pre-tensioned load of a spring 36 setting it back (see FIG. 3) from the housing 12 into the release position by supplying power to the displacement drive 30. By interrupting the power supply of the piezoelectric actuator of displacement drive 30, the release tappet 26 is immediately displaced through the pre-tensioned threaded spring 36 to the standby position more retracted in the housing 12.

The housing 12 can be spatially aligned in relation to a frame or/and the pipetting device 60 shown in FIG. 1 with the positioning pins 36*a* and 36*b*.

Instead of a piezoelectric actuator, the displacement drive 30 may comprise an electromagnet, which generates, or does not generate, a magnetic field by applying and withholding current, thus causing the release tappet 26 to displace. In the case of an electromagnetic displacement force, the release tappet 26 may comprise a permanent magnet or a magnetically soft anchor, which can be displaced by the magnetic field generated by the electromagnetic displacement drive, depending on its power supply status, along the displacement trajectory V together with the release tappet 26 supporting it.

The release tappet 26 in the embodiment shown here projects into a recess 38 penetrating the first device portion 16 and penetrates it both in its standby position and its release position.

The operating principle of the liquid-metering device 10 is explained below based on details of the first device portion 16 and the second device portion 18 shown in FIG. 4.

The opposing surfaces 16*a* and 18*a* of the two device portions 16 and 18 feature a contour which is configured such that, when the two device portions 16 and 18 are in their converged closed position along the motion trajectory B, a mounting space 40 is defined between the two device portions 16 and 18, in which at least an axial portion of the pipetting tip 42 can be fitted. The mounting space 40 extends along a virtual mounting axis A, which coincides with a virtual tip axis S of a pipetting tip 42 fitted into the mounting space 40. The device portions 16 and 18 are in their closed position.

The release tappet, the first device portion 16 penetrated thereby, and the second device portion 18 comprise deformation formations, which define a deformation area 44 at the pipetting-tip mounting device 14, in which a conventional pipetting tip 42 fitted into the mounting space 40 is mechanically deformed in portions when the first and second device portions 16 or 18 are in the closed position.

The aforementioned deformation formations comprise a first deformation formation 46, arranged more closely to housing 12, and a second deformation formation 48 arranged at the second device portion 18.

The first deformation formation 46 comprises a front surface 46*a* of the release tappet 26 (see FIG. 1), facing the second device portion 18, and a constricted section 46*b* extending along the mounting axis A arranged at a distance from the penetration opening 38 at the first device portion 16.

The second deformation formation 48 comprises a substantially level surface 48*a*, extending orthogonally to the motion trajectory B, at the second device portion 18 and a step section 48*b*, in which an inside width between the opposing surfaces 16*a* and 18*a* of device portions 16 and 18 is tapered in steps in the deformation area 44. Alternatively, the step area 48*b* may be configured entirely or partly as an inclined surface.

Since the deformation formation 46 is configured at the release tappet 26 and at the first device portion 16 and since the deformation formation 48 is configured at the second device portion 18 and since the release tappet 26 remains in its standby position at least until the first and second device portion 16 or 18 are in the closed position, the deformation formations 46 and 48 are in a deformation position deforming a fitted pipetting tip 42 when the first and second device portion 16 and 18 are in the closed position and the release tappet 26 is in the standby position. Furthermore, the deformation formations 46 and 48 are in a loading position to facilitate the fitting or retrieval of a pipetting tip 42 from the pipetting-tip mounting device 14 when the first and second device portions 16 and 18 are in the open position. Since the stroke of the release tappet 26 is substantially smaller than the device portions 16 and 18, the position of the release tappet 26 is not relevant. However, it will be in the standby position since the control device 28 is configured to only displace the release tappet 26 only into its release position when the device portions 16 and 18 are in the closed position.

In its release position, the release tappet 26 projects more into the mounting space 40, particularly in its deformation area 44, than in the standby position.

During operation, the front surface 46*a* of the release tappet 26 and the surface 48*a* of the second device portion 18 oppose each other and define a substantially level gap with a consistent gap dimension to be measured along the motion trajectory B, as shown in the example, over the entire gap area defined by the front surface 46*a* of the release tappet 26. The front surface 46*a* of the release tappet 26 and/or the surface 48*a* of the second deformation formation 48 may be arranged with a contour that differs from a level configuration. However, the use of level surfaces is easier for manufacturing the aforementioned components.

The constricted section 46*b* is designed to cause a constriction of a pipetting tip 42 fitted into the mounting space 40 on the side of the penetration opening 38 that is further removed from the metering orifice 50 of the pipetting tip 42. This constriction is designed to reduce the inside width of the pipetting tip 42, which in turn increases the flow resistance of the dosage liquid in the pipetting tip 42 emanating from the deformation area 44 in the direction away from the metering orifice 50. This is to ensure that, when the release tappet 26 mechanically exerts a short mechanical impulse with a duration in the double-digit or low three-digit millisecond range on a deformed portion of the pipetting tip 42 in the deformation area 44 of the pipetting-tip mounting device 14, a resulting pressure wave induced in the dosage liquid held in the pipetting tip 42 causes the discharge of a dosage drop through the metering orifice 50 and does not force the liquid away from the metering orifice 50 toward the increasing cross-sections of the pipetting tip that is conically tapered in the direction of the metering orifice 50.

The liquid-metering device 10 enables the advantageous use of conventional pipetting tips 42 for metering liquid in dosage amounts in the nanoliter range, although the conventional pipetting tips 42 in their undeformed initial state are only configured for metering liquids in the so-called "air displacement" method, which does not allow for metering in the nanoliter range with the aforementioned metering method. A conventional pipetting tip 42 in its undeformed state prior to fitting a portion of the same into the mounting space 40 of the pipetting-tip mounting device 14 and prior to displacing the device portions 16 and 18 into the closed position is shown in FIGS. 1, 2 and 5A. Such a conventional pipetting tip 42 at its lengthwise metering end 52 features the metering orifice 50 and comprises a coupling formation 56 at the opposite lengthwise coupling end 54 for coupling to a pipetting channel 58 of a pipetting device 60 as shown in FIG. 1.

The pipetting tip 42, extending along a virtual tip axis S intersecting it in the center, features a reservoir chamber 62 between the lengthwise coupling end 54 and the lengthwise metering end 52, in which a dosage liquid supply can be held, for example through aspiration via the metering orifice 50.

The aforementioned constricted section 46*b* in the first device portion 16 forms a constriction in the closed position of the device portions 16 and 18 in the reservoir chamber 62 in the portion of the pipetting tip 42 that protrudes from the gap formed by the release tappet 26 and the surface 48*a* in the direction of the lengthwise coupling end 54.

When the pipetting tip 42 is fitted into the mounting space 40 and the device portions 16 and 18 are in the closed position, the deformation area 44 of the pipetting-tip mounting device 14 and the release tappet 26 forms the deformation area 64 at the pipetting tip 42.

The pipetting tip 42 is preferably configured to be rotationally symmetric in relation to its tip axis S as a rotational symmetry axis in the undeformed condition.

Since only the deformation portion 64 of the pipetting tip 42 is deformed by the deformation formations 46 and 48, a rotationally symmetric body section 66 or 68 of the pipetting tip 42 is arranged axially on both sides of the deformation portion 64. These rotationally symmetric body sections 66 and 68 are the undeformed sections of the pipetting tip 42 that axially directly adjoin the deformation portion 64.

FIGS. 5B and 5C show pipetting tips 42 and 42' with slight differences in deformation, once in a view along the displacement trajectory V (FIG. 5C) and once extending orthogonally both to the displacement trajectory V and the mounting axis A (FIG. 5B).

As can be discerned by the slightly different deformation of the pipetting tip 42' in FIG. 5C compared to the pipetting tip 42 of FIG. 5B, the figures show different pipetting tips 42 and 42'. The identical and functionally comparable sections of the pipetting tip 42' in FIG. 5C therefore show the same references as for the pipetting tip 42 in the remaining figures, but are labeled with an added apostrophe. The embodiment of FIG. 5C is only described in terms of its differences from FIG. 5B, with said description also used for explanation of the embodiment 42' of FIG. 5C.

As can be seen in FIG. 5C, the deformation portion 64', in a first extension direction E1 extending orthogonally to the tip axis S, features a substantially larger dimension than in a second extension direction E2, which is orthogonal to the tip axis S and to the first extension direction E1. This also applies to the deformation portion 64 of the pipetting tip 42. The dimension of the deformation portion 64 or 64' in the first extension direction E1 is preferably at least five times larger than the dimension in the second extension direction E2.

In the first extension direction E1, the deformation portion 64 or 64' protrudes radially over the two undeformed body sections 66 and 68 or 66' and 68' that directly adjoin the deformation portion 64 or 64' axially on both sides relative to the tip axis S.

Likewise, the pipetting tip 42 or 42' is deformed radially in the deformation portion 64 or 64' to such an extent that the undeformed body sections 66 and 68 axially adjoining the deformation portion 64 or 64' along the second extension direction E2 radially protrude over the deformation portion 64 or 64'.

When viewing the pipetting tip 42 fitted into the pipetting-tip mounting device 14, the second extension direction E2 extends parallel to the motion trajectory B and thus parallel to the displacement trajectory V. The first extension direction E1 is orthogonal to the second extension direction E2 and orthogonal both to the second extension direction E2 and to the tip axis S or the mounting axis A.

The deformation portions 64 or 64' form a gap space on the inside of the pipetting tip 42 or 42', which features dimensions along the extension directions E1 and E2 that are smaller by the wall thickness of the pipetting tip 42 or 42' than the deformation portions 64 or 64' themselves.

The deformation portion 64 features two level surface sections 64*a* and 64*b*, parallel to each other, at least on its outside due to the level and parallel surfaces 46*a* and 48*a* it is formed from.

The gap space formed on the inside by the deformation portion 64 or 64' can also be formed by level and/or parallel inside surface sections. This is feasible especially if the wall thickness of the pipetting tip 42 or 42' is constant along its axial extension or at least along the reservoir chamber 62 or 62'.

The gap space formed on the inside of pipetting tip 42 or 42' in the deformation portion 64 or 64' preferably features an inside width of about 100 μm in the second extension direction. This value is only given as an example. In contrast, the gap may have an inside width of 5 mm or more in the first extension direction E1.

In the pipetting tip 42 or 42' embodiment shown here, the deformation space 64 or 64' is formed along the tip axis S with the largest dimension. This also applies to the gap space formed by the deformation portion 64 or 64'. It can be configured to be at least about twice as long along the tip axis S as along the first extension direction E1.

Since the deformation portion 64 or 64' of the pipetting tip 42 or 42' is the release section, in which the release tappet 26 transmits a short intermittent mechanical impulse to the dosage liquid held in the pipetting tip 42 or 42' to ballistically discharge a dosage amount in the nanoliter range through the metering orifice 50 or 50', the deformation portion 64 or 64' is preferably arranged more closely to the metering orifice 50 or 50' than to the coupling formation 56 or 56'.

Preferably, the deformation portion 64 or 64' is completely formed by the axial extension half of the pipetting tip 42 emanating from the metering orifice 50.

Since the pipetting tips 42 or 42' are disposable pipetting tips that are discarded after a single use to avoid contaminations, the permanent deformation of the pipetting tip 42 or 42' caused by the deformation formations 46 and 48 during operation is irrelevant.

The liquid-metering device 10 is ideally suited for aliquoting, for example by using a pulsing operation of the displacement drive 30 via the control device 28.

The metering of the dosage liquid amounts in the nanoliter range can be further supported by the pipetting device 60 shown as an example and sketched in FIG. 1. For this purpose, the pipetting device 60 with its pipetting channel 58 can be coupled to the coupling formation 56 of the pipetting tip 42 by way of a coupling feature 70 only shown as a sketch in FIG. 1. The pipetting channel 58 holds a gas as a working fluid, with a pressure detectable by a pressure sensor 72.

The pressure of the working fluid in the pipetting channel 58 can be changed by a pressure-adjustment device 74, which may for instance comprise a pipetting piston 76 held in the pipetting channel 58 along a channel axis K, in the known manner.

The pressure-adjustment device 74 may feature an adjustment drive 78, through which the pipetting piston 76 is adjustable along the channel axis K in the pipetting channel 58, i.e., through which the pressure of the working fluid in the pipetting channel 58 can be changed. A pipetting control device 80, connected with the pressure sensor 72 as well as with the adjustment drive 78 of the pipetting piston 76 through signal transmission, can effectuate the adjustment of the pipetting piston 76, depending on an actual working fluid pressure measured by pressure sensor 72 and, if applicable, further depending on a target working fluid pressure set in a supply device of the pipetting control device 80, using the corresponding control of the adjustment drive 78.

The pipetting control device 80 may be connected to the control device 28 of the liquid-metering device 10 via signal transmission.

The invention claimed is:

1. A liquid-metering device for ballistically dispensing a discrete dosage amount of a dosage liquid in a dosage volume range of 0.3 nl to 900 nl from a pipetting tip coupled with a dosage liquid supply, the liquid-metering device comprising:

a pipetting-tip mounting device having a first and a second deformation formation defining therebetween an axial longitudinal section of a mounting space configured to accommodate a portion of the pipetting tip, a portion of the mounting space being a deformation area, the first and second deformation formations being moveable toward each other to a closed position and away from each other into an open position, a triggering plunger adapted to be movable relative to the pipetting-tip mounting device, wherein the triggering plunger is movable between a standby position projecting into the deformation area of mounting space and a triggering position further projecting into the deformation area of the mounting space than the standby position, a displacement drive coupled to the triggering plunger in a motion-transmitting manner, for displacing the triggering plunger by an impulse movement, at least from the standby position to the triggering position, and a control device connected in a signal transmitting manner to the displacement drive for controlling operation of the displacement drive, wherein the first and second deformation formations are adapted for at least one of fitting the pipetting tip into the pipetting-tip mounting device and removing the pipetting tip from the pipetting-tip mounting device in the open position, wherein the first and the second deformation formations are adapted to deform plastically a section of the pipetting tip fitted into the mounting space in the deformation area when moved into the closed position, and wherein the control device is configured to actuate the displacement drive to displace the triggering plunger along a displacement trajectory from the standby position to the triggering position when the first and the second deformation formation are in the closed position to mechanically exert an impulse on a deformed portion of a pipetting tip mounted in in the deformation area of the mounting space.

2. The liquid-metering device according to claim 1, wherein the liquid-metering device is configured to deform, in the deformation area, a portion of a pipetting tip fitted in the mounting space for a deformation interval, wherein said deformation interval is longer than a displacement interval of the motion that displaces the triggering plunger from the standby position to the triggering position.

3. The liquid-metering device according to claim 1, wherein the second deformation formation comprises a wall section delimiting the mounting space.

4. The liquid-metering device according to claim 1, wherein the pipetting-tip mounting device comprises a first device portion, arranged more closely to the triggering plunger, penetrable by the triggering plunger, and a second device portion further removed from the triggering plunger, wherein the second device portion can be moved further away from and converged to the first device portion.

5. The liquid-metering device according to claim 3, wherein the second deformation formation is arranged at the second device portion.

6. The liquid-metering device according to claim 4, further comprising:

an actuating drive coupled to the second device portion, adapted to move the second device portion between the open position further removed from the first device portion and the closed position more closely converged to the first device portion.

7. The liquid-metering device according to claim 6, wherein the second device portion is pre-tensioned in the opened or the closed position.

8. The liquid-metering device according to claim 1, wherein the triggering plunger is pretensioned in the standby or the triggering position.

9. The liquid-metering device according to claim 1, wherein the triggering position of the triggering plunger is defined by a mechanical stop that is adjustable along the displacement trajectory of the triggering plunger.

10. The liquid-metering device according to claim 1, wherein the displacement trajectory forms an angle in the range of 70 to 110 degrees, with the virtual mounting axis.

11. The liquid-metering device according to claim 4, wherein a motion trajectory along which the first and second device portion can be converged, forms an angle in the range of 70 to 110 degrees with the mounting axis.

12. The liquid-metering device according to claim 11, wherein the displacement trajectory and the motion trajectory are at least partially parallel.

13. The liquid-metering device according to claim 1, comprising the pipetting tip which comprises a lengthwise coupling end having a coupling formation for coupling to a pipetting channel of a pipetting device and having a lengthwise metering end opposite to the lengthwise coupling end having a metering orifice through which the discrete dosage amount can be dispensed, wherein the pipetting tip has a reservoir chamber between the lengthwise coupling end and the lengthwise metering end, in which the dosage liquid supply can be held, and wherein the pipetting tip is fitted in the mounting space.

14. The liquid-metering device according to claim 13, wherein the pipetting tip extends between the lengthwise coupling end and the lengthwise metering end along a pipetting tip axis, and wherein the pipetting tip and the reservoir chamber axially protrude over the deformation area in relation to the pipetting tip axis.

15. The liquid-metering device according to claim 14, wherein the deformation area is arranged more closely to the lengthwise metering end than to the lengthwise coupling end, wherein the deformation area is arranged completely in a lengthwise half of the pipette tip emanating from the lengthwise metering end of an axial extension area of the pipetting tip.

16. The liquid-metering device according to claim 13, wherein the pipetting tip comprises a plastically deformed portion situated in the deformation area having two opposing, interior wall sections across a gap on an inside of the pipetting tip.

17. A pipetting device comprising a pipetting channel extending along a channel trajectory which is filled at least partly with a working fluid differing from the dosage liquid, and having a coupling formation at a free lengthwise end for temporary, detachable coupling to a pipetting tip, a pressure-adjustment device configured to modify a pressure of the working fluid in the pipetting channel, a pressure sensor, configured and arranged for sensing the pressure of the working fluid, in the pipetting channel, a pipetting control device connected to the pressure sensor and the pressure-adjustment device for controlling operation of the pressure-adjustment device, and is configured to control operation of the pressure-adjustment device at least in accordance with an actual working fluid pressure sensed by the pressure sensor, and a liquid-metering device comprising:

a pipetting-tip mounting device having a first and a second deformation formation defining therebetween an axial longitudinal section of a mounting space configured to accommodate a portion of the pipetting tip, a portion of the mounting space being a deformation area, the first and second deformation formations being moveable toward each other to a closed position and away from each other into an open position, a triggering plunger adapted to be movable relative to the pipetting-tip mounting device, wherein the triggering plunger is movable along a displacement trajectory between a standby position projecting into the deformation area of the mounting space and a triggering position further projecting into the deformation area than the standby position, a displacement drive coupled to the triggering plunger in a motion-transmitting manner for displacing the triggering plunger by an impulse movement at least from the standby position to the triggering position, and a control device connected in a signal transmitting manner to the displacement drive for controlling operation of the displacement drive, wherein the first and second deformation formations are adapted for at least one of fitting the pipetting tip into the pipetting-tip mounting device and removing the pipetting tip from the pipetting-tip mounting device in the open position, wherein the first and the second deformation formations are adapted to deform plastically a section of the pipetting tip fitted into the mounting space in the deformation area when moved into the closed position, wherein the control device is configured to actuate the displacement drive to displace the triggering plunger from the standby position to the triggering position when the first and the second deformation formations are in the closed position, to mechanically exert an impulse on a deformed portion of a pipetting tip mounted in in the deformation area of the mounting space, and wherein a channel trajectory extending from the pipetting channel is parallel or collinear to a mounting axis of the mounting space.

18. The pipetting device according to claim 17, wherein the pipetting tip is coupled to the coupling formation of the pipetting channel.

19. The liquid-metering device according to claim 1, wherein the release deformation is an exclusively elastic deformation.

* * * * *